No. 813,473. PATENTED FEB. 27, 1906.
F. R. WILLSON, Jr.
CONVEYER CHUTE.
APPLICATION FILED MAY 22, 1902.

3 SHEETS—SHEET 1.

Witnesses:
Inventor
Attorney.

No. 813,473. PATENTED FEB. 27, 1906.
F. R. WILLSON, Jr.
CONVEYER CHUTE.
APPLICATION FILED MAY 22, 1902.

3 SHEETS—SHEET 2.

No. 813,473. PATENTED FEB. 27, 1906.
F. R. WILLSON, Jr.
CONVEYER CHUTE.
APPLICATION FILED MAY 22, 1902.
3 SHEETS—SHEET 3.
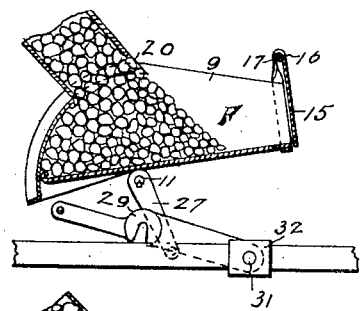
Fig. 3
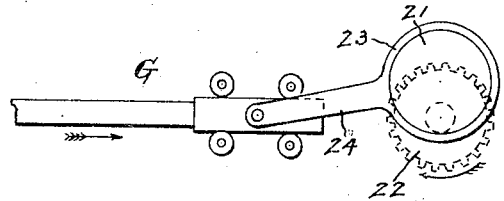
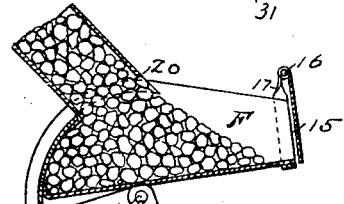
Fig. 4
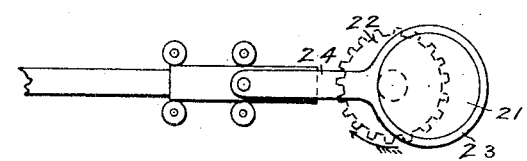
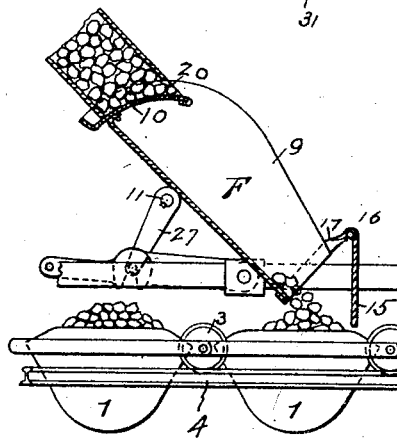
Fig. 5.
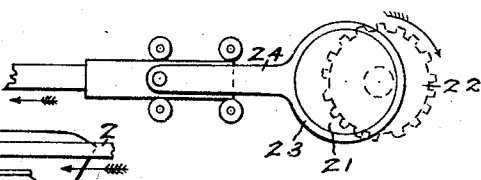
Witnesses:
A. K. Williams Jr.
E. P. Alexander
Inventor
Freeman R. Willson, Jr.
by H. H. Bliss
Attorney

UNITED STATES PATENT OFFICE.

FREEMAN R. WILLSON, JR., OF WORTHINGTON, OHIO, ASSIGNOR TO JOSEPH A. JEFFREY, OF COLUMBUS, OHIO.

CONVEYER-CHUTE.

No. 813,473.　　　Specification of Letters Patent.　　　Patented Feb. 27, 1906.

Application filed May 22, 1902. Serial No. 108,571.

*To all whom it may concern:*

Be it known that I, FREEMAN R. WILLSON, Jr., a citizen of the United States, residing at Worthington, in the county of Franklin and State of Ohio, have invented certain new and useful Improvements in Conveyer-Chutes, of which the following is a specification, reference being had therein to the accompanying drawings.

The object of the invention is to provide means for feeding material at intervals and with quickness and accuracy from a containing or conducting device, such as a hopper or chute, to any desired receptacle, and especially to the several buckets of a moving conveyer.

The invention consists in the parts and combinations thereof hereinafter set forth.

In order to enable the invention to be clearly understood, I have shown in the accompanying drawings means for carrying the same into practical effect, in which—

Figure 1:
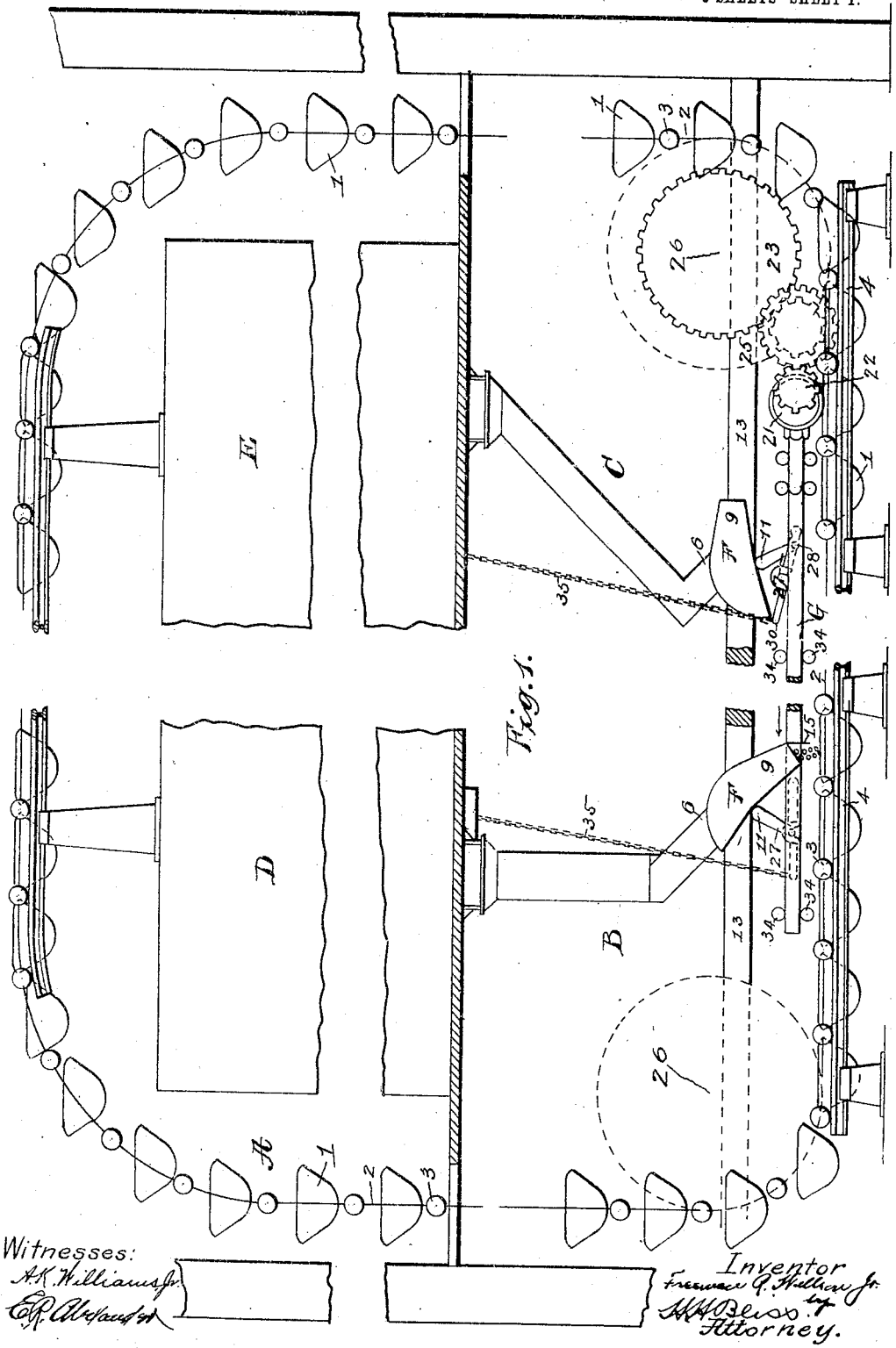
Figure 2:
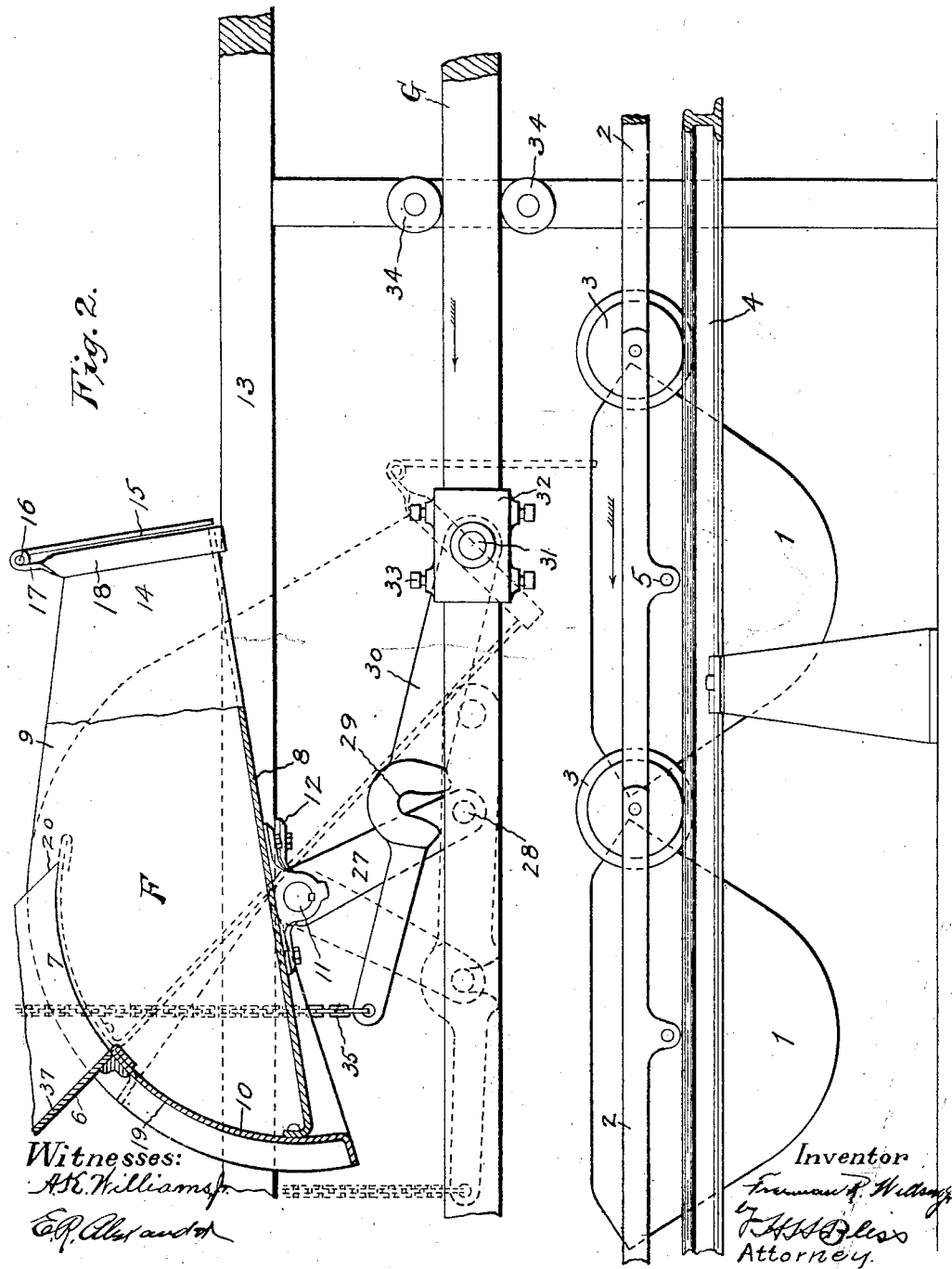

Figure 1 is an elevation, partly in section and broken away at certain points, of a conveying apparatus having combined therewith delivery-chutes embodying the invention. Fig. 2 is a side view, partly in section, on a larger scale, of a portion of a bucket conveyer and a delivery-chute embodying the invention. Figs. 3, 4, and 5 are side views, partly in section, showing different positions of the apparatus.

Referring to the drawings, A indicates an endless bucket conveyer comprising buckets 1, bucket-connecting links 2, supporting-wheels 3, and wheel-supporting guides 4, which parts may be of any suitable known or preferred construction. For these material-receiving means may be substituted other containing or conducting receptacles for the material. The buckets shown are of the tilting type, pivotally supported at 5 on the links 2. The means for tilting the buckets when they arrive at their point or points of delivery may be of the usual character, not necessary to be here described.

B C indicate receptacles or conduits from or through which material is to be delivered to the conveyer A. In Fig. 1 I have shown but two of these conduits leading from bins or hoppers D and E; but it will be understood that a series of a considerable number of such material-delivering means may be employed from which the conveyer may be fed at different points with different materials, such as coal, ashes, &c. The extreme delivery ends of the conduits are shown at 6 having delivery-openings 7, at and below which are mounted the movable chutes F. Each chute is adapted to receive and also to temporarily contain material and to that end is formed with bottom, side, and rear plates or pieces 8, 9, and 10. This construction is conveniently made of steel-plate, as indicated in Fig. 2. The receiving and delivering movements of the chute are permitted by attaching the latter to a transverse journal 11, the ends of which are carried in bearings 12, attached to a frame 13. The chute is preferably arranged so that its sides 9 slightly inclose the lower end 6 of the conduit, and at the delivery end 14 of the chute is supported a valve or gate 15, adapted to swing by gravity on a pivot 16. The latter turns at its ends in bearing-brackets 17, formed on a metal band 18, that incloses and is attached to the sides and bottom of the chute. This gate in the receiving position of the chute automatically closes to prevent the spilling of the material as it enters the chute from the conduit. When the chute moves into delivering position with its end 14 depressed, the gate automatically opens to allow the delivery of the material freely to the conveyer or other receptacle. When the chute is in the receiving position, (shown in full lines in Fig. 2,) the opening 7 is to be unobstructed, the chute itself in such position preventing the delivery of more material from the conduit than can be contained by the chute. When it is in the delivery position, (shown in dotted lines in Fig. 2,) the opening 7 is closed by other means suitable for the purpose. According to my invention this means consists of a closing means or gate, so arranged that its opening and closing movements alternate with the receiving and delivering movements of the chute. This operation of such closing means may be effected in various ways. I prefer for the conduit-closing means a curved plate 19, rigidly attached to the chute. It may constitute the rear wall of the same, as shown; but this is not essential. The closing plate or surface 19 is made concentric with the axis of the chute at 11 and the conduit-walls at the sides of the opening 7 are correspondingly shaped. I prefer to leave at the front of the conduit end 6 a sufficient opening (shown at 20) to prevent any jamming of the material or lumps of the same between the forward end of the conduit-closing plate and said front wall of the conduit. This opening will not permit any undesired escape of the material, as will be readily understood from an examination of Figs. 3, 4, and 5.

My invention is not confined to any particular means for giving to the chute and to the closing-plate the movements above described. I have, however, devised certain further improvements in such operating means. While the chutes may be operated individually, I prefer to operate them simultaneously in a series and to arrange for readily disconnecting any particular chute or chutes from the operating mechanism.

G is a reciprocating-shaft extending along the series of chutes F and operated in any convenient manner. I have shown it as driven by an eccentric 21, attached to a pinion 22 and fitting within a band 23. The latter is connected by a pitman 24 with the shaft or bar G. The pinion 22 is driven by a suitable train of gearing 25 from one of the rotary guiding-shafts 26 of the conveyer. At suitable intervals the bar G has means for operatively connecting it with each of the chutes F to convert the reciprocating movement of the bar into the described tilting movement of the chute. For this purpose the journal 11 of each chute has fixed thereon an arm 27, provided with a wrist-pin 28, which latter is engageable by a seat or recess 29 in an adjustable pitman 30. This pitman is pivotally connected at 31 with a sleeve 32, the latter being longitudinally adjustable on the bar G and secured in place on the latter by set-screws 33. The bar G is supported and guided in its reciprocations by rollers 34 on the frame 13. In order that any desired chute or chutes may be thrown out of operation, the pitmen are suspended by links or chains 35, leading to any convenient point of operation. When any such chain is drawn up, the seat 29 is disengaged from the wrist-pin 28 and the chute is left undisturbed, while the bar G may continue its reciprocations and the operation of the chutes not so disconnected.

It will be understood that the operation of the bar G is timed with the movement of the conveyer-buckets by a proper arrangement of the gearing described, so that the tilting of any chute to delivery position takes place only when a conveyer-bucket is present in proper position beneath the end 14 of the chute to receive the contents of the latter. The tilting of the chutes, where a series of the latter are employed, is further arranged to take place so that each chute will deliver to certain of the conveyer-buckets and will not deliver to others of said buckets, whereby all of the series of chutes may be accommodated with sufficient receiving-space in the conveyer for the material delivered.

While other forms of plate might be adapted in place of the plate 19 to effect a practical closing of the conduit, the particular shape described, concentric with the axis 11, has the advantage that it maintains close proximity of contact with the rear wall 37 of the conduit at all times to prevent the escape of material. The side walls of the conduit may be curved at their lower edges to correspond with the curvature of the plate 19 or may extend down a little at the sides of and below said closing-plate.

What I claim is—

1. In a delivery or feed mechanism, the combination of a conduit for material having a delivery-opening, a chute adapted to receive material from said opening, a longitudinally-reciprocating bar to which the chute is connected whereby said chute may be moved to deliver such received material, and a closing means for said opening operated to cut off material from the chute when the latter is moved to deliver its material.

2. In a delivery or feed mechanism, the combination of a conduit for material having a delivery-opening, a chute adapted to receive material from said opening, a longitudinally-reciprocating bar to which the chute is connected whereby said chute may be moved to deliver such received material, and a closing means for said opening carried by the chute and acting to cut off material from the chute when the latter is moved to its delivery position.

3. The combination of a series of material-conduits having delivery-openings, discharge-chutes adapted to receive material from said openings, and to travel in a circular path to deliver said material a reciprocating bar, and means for connecting any of said chutes to the bar, substantially as set forth.

4. The combination of a tilting chute adapted to receive and deliver material, a reciprocating bar, an adjustable pitman connected with the bar, and means whereby said pitman may be connected with the chute to operate the latter.

5. The combination of a conduit for material having a delivery-opening, a tilting chute near said opening, means operated with the chute for closing said opening when the chute is moved into delivery position, a longitudinally-reciprocating bar for operating the chute and means for connecting said bar and chute.

6. The combination of a series of tilting chutes, a reciprocating bar, a series of adjustable pitmen connected with the bar and means whereby the latter may be connected with and disconnected from the chutes, substantially as set forth.

7. The combination of a conveyer, a conduit for material having a delivery-opening, a chute adapted to receive material from said opening, a longitudinally-reciprocating bar to which the chute is connected whereby said chute may be operated to deliver such received material to the conveyer, and a closing means for said opening operated with the chute to cut off material from the chute when the latter is moved into delivery position.

8. The tilting chute having at its delivery end a gravity-actuated gate adapted to retain the material when the chute is in its receiving position and to swing freely relative to the said delivery end to permit free discharge of the material when the chute is in its delivery position, and having at its receiving end a cut-off plate arranged to check the flow of material to the chute when it is in its delivery position, substantially as set forth.

9. The combination of an endless bucket conveyer, driving mechanism therefor, a material-conduit having a delivery-opening, a discharge-chute adapted to receive material from said opening and to travel in a circular path to discharge it into said buckets, and means for operating said discharge-chute connected with the driving mechanism of the conveyer, substantially as set forth.

10. The combination of an endless bucket conveyer, driving mechanism therefor, the material-conduit having a delivery-opening, the discharge-chute adapted to receive material from said opening and discharge it into said buckets, closing means for said opening operating to cut off the flow of material from the said conduit to the discharge-chute while the latter is delivering its charge into a bucket, and means for operating said discharge-chute connected with the driving mechanism of the conveyer, substantially as set forth.

11. The combination of an endless bucket conveyer, driving mechanism therefor, a material-conduit having a delivery-opening, a discharge-chute receiving material from said opening, closing means for said opening adapted to intermittently cut off the flow of material from said conduit to said discharge-chute while the latter is delivering its charge into a bucket, and operating means connecting said closing means with the driving mechanism of the conveyer, substantially as set forth.

12. The combination of an endless bucket conveyer, driving mechanism therefor, the material-conduit having a delivery-opening, a discharge-chute receiving material from said opening, closing means for said opening carried by the chute and acting to intermittently cut off material from the chute when the latter is delivering its charge into a bucket, and means connecting said discharge-chute with the driving mechanism of the conveyer, substantially as set forth.

13. The combination of an endless bucket conveyer, driving mechanism therefor, material-conduits having delivery-openings, discharge-chutes adapted to receive material from said openings and to travel in a circular path to discharge said material, a reciprocating bar connected with the said driving mechanism, and means for detachably connecting any of said chutes with said bar, substantially as set forth.

14. The combination of a conveyer, a material-conduit having a delivery-opening, a tilting chute adapted to receive material from said opening and having a depending arm, a reciprocating bar, and means for detachably connecting said bar to said arm to operate the chute, substantially as set forth.

15. The combination with a material-conduit, of a chute adapted to receive material from said conduit and arranged to oscillate relative to said conduit in order to discharge material received therefrom, and having at its end adjacent to said material-conduit a cut-off wall arranged to cut off the flow of material from said conduit when said chute is in its discharge position.

16. An oscillating chute arranged to intermittently receive and deliver material, said chute having at its delivery end a gravity-actuated gate pivotally connected to it and adapted to retain material when the chute is in its receiving position and to swing freely relative to said delivery end to permit the free discharge of the material when the chute is in its delivery position.

17. The combination with a material-conduit, of an oscillating chute adapted to receive material from said conduit and having at its end adjacent to said conduit a cut-off wall arranged to cut off the flow of material to said chute when the chute is in its discharge position and having at its discharge end a gravity-actuated pivotally-mounted gate.

In testimony whereof I affix my signature in presence of two witnesses.

FREEMAN R. WILLSON, Jr.

Witnesses:
JOE WEBSTER,
JOHN L. V. BONNEY.